(No Model.)　　　　　　　　　　　　　　　　　　2 Sheets—Sheet 1.
D. K. ALLINGTON.
BAND SAW MILL.

No. 337,647.　　　　　　　　Patented Mar. 9, 1886.

WITNESSES
C. A. Moores
F. E. Moore

INVENTOR
D. K. Allington (No Model.) 2 Sheets—Sheet 2.
D. K. ALLINGTON.
BAND SAW MILL.
No. 337,647. Patented Mar. 9, 1886.
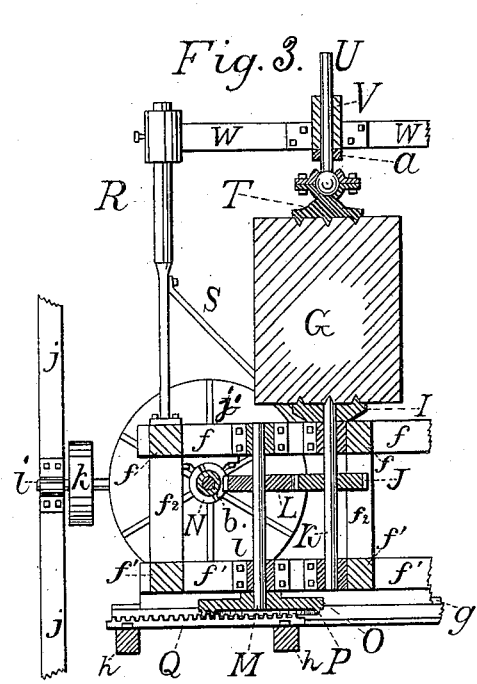
Fig. 3.
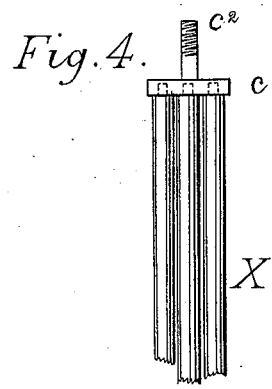
Fig. 4.
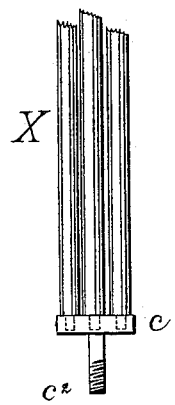
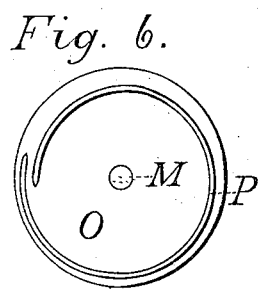
Fig. 6.
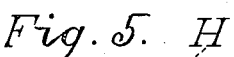
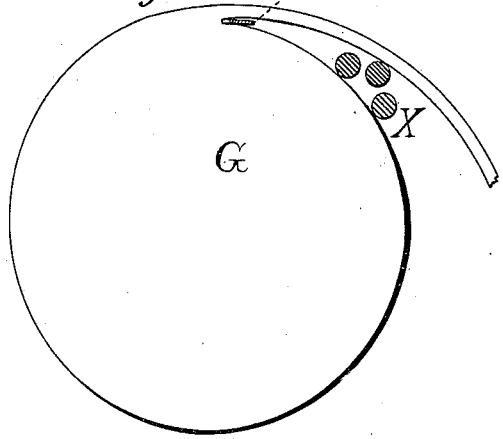
Fig. 5.
Fig. 7.
WITNESSES
C. A. Moores.
F. E. Moore.
INVENTOR
D. K. Allington.

United States Patent Office.

DAVID K. ALLINGTON, OF EAST SAGINAW, MICHIGAN.

BAND-SAW MILL.

SPECIFICATION forming part of Letters Patent No. 337,647, dated March 9, 1886.

Application filed February 26, 1885. Serial No. 157,137. (No model.)

*To all whom it may concern:*

Be it known that I, DAVID K. ALLINGTON, a citizen of the United States, residing at East Saginaw, in the county of Saginaw and State of Michigan, have invented a new and useful Improvement in Band-Saw Machines, of which the following is a specification.

My invention relates to improvements in band-saw machines for sawing boards convolutely from around the log; and it consists of the mechanism for obtaining a uniform convolute feed motion, the frame for containing the log to be sawed, the device for cleaning the saw, and the anti-friction spreader for freeing the saw in the cut, as hereinafter more fully explained.

Figure 1:
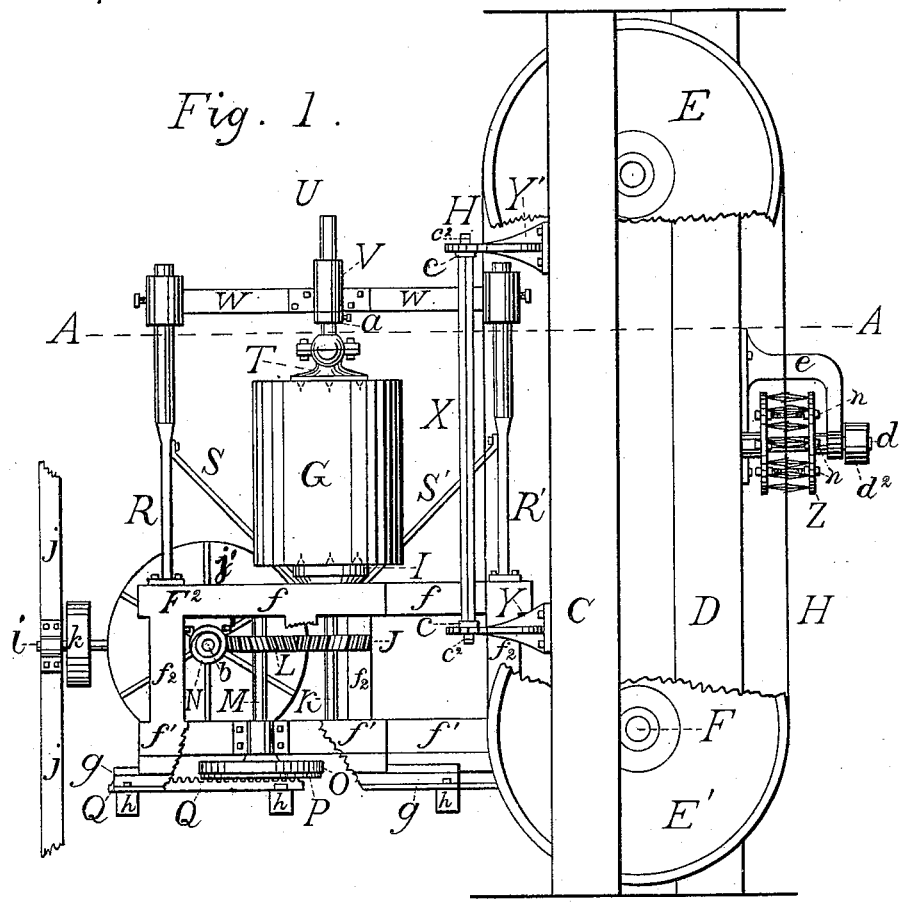
Figure 2:
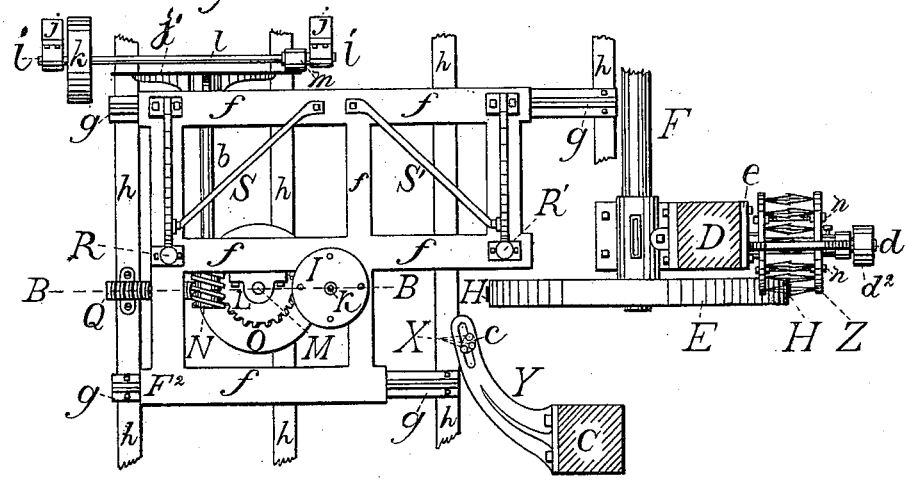

Figure 1 is a side elevation, with part of the wheels E and E' and part of the supporting-frame cut away. Fig. 2 is a top view of a section through the broken lines A A in Fig. 1. Fig. 3 is a side elevation of a section through the broken line B B in Fig. 2. Fig. 4 is an elevation of the anti-friction spreader, with the center portion cut away. Fig. 5 is an end view of the log, showing the application of the spreader in the cut. Fig. 6 is a view of the bottom side of the spiral or convolute threaded disk. Fig. 7 is a view of one half of the adjustable cleaning-brush.

Similar letters refer to similar parts throughout the several views.

In the drawings, H represents the endless band-saw, which is supported by the wheels E and E', journaled in suitable bearings bolted to the vertical post D, and is driven by the lower wheel, E', by a pulley on the shaft F from any suitable power. The upper wheel, E, is journaled in a bearing vertically adjustable by means of a screw to regulate the tension of the saw.

The supporting-frame is located in front of the saw, and its working center is in a line drawn from the point of a tooth in the saw nearly perpendicular to its side, and is constructed of three top horizontal pieces bound together by three girts, $f$, and three bottom horizontal pieces bound together by three girts, $f'$. These frames thus constructed are bound together one above the other by the vertical posts $f^2$; or it may be constructed in any convenient form that will allow of bearings for the feed-gear and top part of the supporting-frame in their proper relation to each other. About midway on the middle horizontal pieces, $f$ and $f'$, is journaled a vertical shaft, K, on the top of which is disposed the disk I, which supports the log to be sawed, and which is furnished with spurs to secure it in position. About midway on the shaft K is disposed the helical gear-wheel J, which meshes into and is driven by the helical gear-wheel L on the shaft M, which is journaled within the frame in proper relation to the shaft K, and is driven by the worm N on the horizontal shaft $b$. On the lower end of the shaft M is disposed a disk, O, on the bottom or under side of the face of which is a spiral thread, P, which meshes with the rack Q, which is securely fastened to the foundation-timbers $h$ and $h$.

Within the frame, and on two of the horizontal bars $f$, is journaled the shaft $b$, in such a position that the worm N on the end of the shaft meshes with the helical gear or worm wheel L. On the opposite end of the shaft $b$, and outside of the frame, is disposed the friction-disk $j'$, which is driven by the friction-wheel $m$ on the shaft $i$, which is journaled in bearings bolted to the vertical posts J independently of the supporting-frame $F^2$, and is driven by any suitable power applied to the pulley $k$. On top of the frame $f$, and at one side of its working center, are erected two standards, R and R', which are turned off a distance down from the top and secured from vibrating by the braces S and S, which are securely bolted to the supporting-frame $F^2$. On these standards is disposed the connecting-bar W, vertically adjustable on said standards, and secured in position by means of set-screws. Midway on this bar W is disposed the bracket journal-box V, in such a position that the center of its contained shaft U is directly over the center of the shaft K and disk I. The shaft U revolves in the journal-box V, and is vertically adjustable by means of the set-collar $a$. On the bottom end of the shaft U is disposed by a ball-and-socket joint the disk T, which is provided with spurs on its face to engage with and support the top end of the log G. The supporting-frame is guided and supported on two V- shaped tracks, g, which are disposed on the floor-timbers h h h, and fit in a V-shaped groove in the bottom of the supporting-frame.

To clean the saw of the shaving of wood, I mount on the post D or any convenient place a bracket, e, in which is journaled the shaft d at a right angle with the saw, on which is placed the brush Z, driven by any suitable power applied to the pulley $d^2$. The brush is constructed of two disks, around the inside of the face of which are disposed bristles standing perpendicular to their faces. (See Fig. 7.) These disks are feathered on the shaft d and secured in position by set-screws, and are adjustable to or from each other by means of the adjusting-bolts n, which are furnished both outside and inside with nuts which determine their position with reference to each other and the saw.

In order to free the saw in the cut, I use an anti-friction spreader, X, constructed with three rollers, though a less or greater number may be used, which I journal at each end in the heads c in such a position with respect to each other that two of them will bear against the body of the log and the third will bear against the inside of the board which is cut convolutely from around the log and is still attached to it. This position is shown in section at Fig. 5. To support the spreader in proper relation to the saw and its cut, the heads c are provided with pins $c^2$, which slide freely in the slots in the brackets Y and Y', which are mounted on the post C or any convenient place.

Having thus described the construction of said band-saw machine, I will now describe its operation.

The log is placed in the machine, centered on the disk I, and secured therein by lowering the ball-and-socket-jointed centering-disk T by the shaft U, which is made secure by the set-collar a. The log being placed in the machine, the operator then applies the friction m to the friction-disk j', which revolves the worm N, which meshes with and drives the helical gear-wheel L, which in turn drives the helical gear-wheel J, thereby revolving the disk I and the log G, and as the spiral-threaded disk O P is revolved simultaneously with the log it advances the log toward the saw at every revolution a distance equal to the thickness of the board to be sawed and its saw-kerf.

The friction-disk m is disposed on the shaft i in such a position in relation to the friction-disk j' that the distance from its face center to the center of the friction-disk j' is the same as the distance between the center of the log to the cutting-edge of the saw. It will be readily seen that by this arrangement a uniform proportion between the travel of the point of contact on the friction m and the feed of the saw is maintained throughout the operation of cutting up a log.

The cleaning-brush is mounted at the return side of the saw directly in front of its cutting-edge, the plane of its revolution being at a right angle with the plane of the revolution of the travel of the saw, but revolving at a greater rate of speed, and as the brush acts on both sides of the saw it cleans the sawdust or shavings of wood from the throat of the teeth of the saw and throws it away from the plane of its travel, so it cannot be caught up again and be returned to the log to clog and impede the cutting of the saw.

The spreader X is mounted, as described, back of the cutting-edge of the saw, and is started in as soon as the log is cut sufficiently to allow of its admission, and as the log is continued to be sawed convolutely from around its periphery the board sawed will coil around the spreader and log, and be held away from the body of the log, thereby freeing the saw in the cut.

The brush heretofore in use to clean the sawdust or shaving of wood from the teeth of an endless band-saw that saws boards convolutely from around the log has been made with a single wheel with bristles standing out from its periphery, and bearing against the inner side of the return side of the saw, and revolving in the same direction, but at a greater rate of speed. Such a brush so constructed throws the sawdust or shavings of wood up along the plane of the travel of the saw, a portion of which is caught up again and returned to the log, which clogs and impedes the cutting of the saw. My brush obviates this evil by operating on both sides of the saw at the same time, and the plane of its revolution being at a right angle with the plane of the travel of the saw it thereby throws the sawdust or shavings of wood away from the plane in which the saw travels.

I am aware that prior to my invention stationary and revolving disk spreader-blades have been made and used in connection with circular saws, but which cannot be applied to a band saw machine that saws boards convolutely from around the log, as for this purpose it requires a self-adjusting spreader-blade.

The arrangement heretofore in use for securing the upper end of the log is an arm extending from a post or column, leaving the outer end of the arm without lateral support. The disadvantage of such arrangement is that the arm vibrates to such an extent that it does not insure an even and regular cut. My invention obviates this evil by the bar W in Fig. 1 being secured at both ends to the standards R and R', which will prevent all lateral movement.

Having described my invention, what I claim as new, and desire to secure by Letters Patent, is—

1. In an endless band-saw machine, the combination of the anti-friction spreader X, constructed with rollers journaled in the heads c and c, self-adjusting in the slots in the brackets Y and Y', all substantially as described, and for the purpose hereinbefore set forth.

2. In a band-saw machine, the combination of a standard-frame supporting band-wheels on which an endless saw is carried, a supporting-frame provided with vertical standards connected at their upper ends by an adjustable bar supporting a disk for holding the log in a vertical position, and means for raising and lowering said bar, substantially as described.

3. In a band-saw machine, the combination of an endless saw, upper and lower band-wheels, a brush for cleaning the saw, a standard-frame for supporting the wheels, a spreader, and a movable frame or carriage consisting of an upper and lower frame secured together by suitable girts, revolving disks for supporting the log, an adjustable frame for regulating the distance of separation of the disks, and mechanism for operating the same, substantially as described.

DAVID K. ALLINGTON.

Witnesses:
C. A. MOORES,
F. E. MOORE.